United States Patent
Chou et al.

(10) Patent No.: US 9,616,523 B2
(45) Date of Patent: Apr. 11, 2017

(54) LASER PROCESSING DEVICE WITH A HIGH SPEED VIBRATION UNIT

(71) Applicant: METAL INDUSTRIES RESEARCH & DEVELOPMENT CENTRE, Kaohsiung (TW)

(72) Inventors: Chen-Bin Chou, Kaohsiung (TW); Chao-Yung Yeh, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 239 days.

(21) Appl. No.: 14/521,730

(22) Filed: Oct. 23, 2014

(65) Prior Publication Data

US 2015/0151382 A1   Jun. 4, 2015

(30) Foreign Application Priority Data

Dec. 4, 2013   (TW) .............................. 102144382 A

(51) Int. Cl.
*B23K 26/06* (2014.01)
*B23K 26/08* (2014.01)

(52) U.S. Cl.
CPC ...... *B23K 26/0648* (2013.01); *B23K 26/0869* (2013.01); *B23K 26/0876* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,755,646 A * | 8/1973 | Muller | .................... | G01M 1/22 219/121.19 |
| 4,851,978 A * | 7/1989 | Ichihara | .............. | G03F 7/70583 355/67 |
| 5,068,515 A * | 11/1991 | van den Bergh | ...... | A61N 5/062 219/121.73 |
| 5,198,837 A * | 3/1993 | Ikshizaka | ........... | G02B 26/0816 347/256 |
| 5,307,207 A * | 4/1994 | Ichihara | ................ | G02B 26/10 353/122 |
| 5,615,777 A * | 4/1997 | Weichman | ........... | G01N 21/951 209/511 |
| 7,002,739 B2 * | 2/2006 | Awamura | ........... | G02B 27/0933 359/224.1 |
| 7,129,441 B2 * | 10/2006 | Yamazaki | .............. | B23K 26/10 219/121.78 |
| 7,397,592 B2 * | 7/2008 | Tanaka | ................. | G02B 26/105 219/121.75 |

(Continued)

*Primary Examiner* — Quang D Thanh
*Assistant Examiner* — Renee Larose
(74) *Attorney, Agent, or Firm* — patenttm.us

(57) ABSTRACT

A laser processing device has a laser source and a high speed vibration unit. The laser source has a laser-emitting end being capable of emitting a laser beam adapted to process a workpiece. The high speed vibration unit is located on a moving path of the laser beam and is capable of vibrating periodically along a direction parallel to the moving path of the laser beam such that the focusing point of the laser beam moves periodically on the workpiece at high speed. The laser processing device with the fast moving focusing point is able to efficiently process parts of the workpiece at specific depths. Therefore, product quality and production rate are increased.

8 Claims, 3 Drawing Sheets

(56) References Cited

U.S. PATENT DOCUMENTS

| | | | |
|---|---|---|---|
| 7,670,027 B2* | 3/2010 | Nagamune | G02B 5/0221 |
| | | | 362/259 |
| 7,714,305 B2* | 5/2010 | Visser | G03F 7/70041 |
| | | | 250/492.1 |
| 7,798,660 B2* | 9/2010 | Itoh | G02B 6/0028 |
| | | | 349/96 |

* cited by examiner

LASER PROCESSING DEVICE WITH A HIGH SPEED VIBRATION UNIT

BACKGROUND OF THE INVENTION

1. Field of the Invention

The present invention relates to a laser processing device, and more particularly to a laser processing device that has a high speed vibration unit and is capable of generating a three-dimensional cylindrical light beam.

2. Description of Related Art

Laser processing is generally used in various industries and is applied to fields of micro flow channel processing, panel cutting and even medical cosmetology. A laser beam used the laser processing has advantaged characteristics of small light spot and high energy facilitating precise processing in the aforementioned fields. A conventional laser processing device employs a laser source emitting a laser beam through a set of lenses. The lenses refract and focus the laser beam at a focus point for processing a workpiece. A maximum energy of the laser beam is only concentrated at the focusing point such that a processing depth is limited by the focusing point. Therefore, the laser processing device is merely able to process a surface of the workpiece instead of processing a deep and internal part of the workpiece.

To process a workpiece in different depths, the conventional laser processing device is adjusted to change the focusing point on the workpiece by focusing means. For example, a vertical position of the focusing lens is adjusted such that a vertical position of the focusing point is adjusted accordingly. Therefore, a depth of the focusing point on the workpiece is changed. However, during the laser processing, speed of adjusting the focusing point is slow and therefore prolongs the total processing period. A shallower layer of the workpiece is easily hardened before completion of adjustment of the focusing point to a deeper position, and shallower hardened layer of the workpiece forms a barrier and prevents a deeper layer from being removed out of the workpiece. The material of deeper layer in the workpiece may also be inadvertently sputtered out of the processing zone and forms a flange on the workpiece, so called "crater phenomenon". The flange causes the surface of the workpiece bumpy and negatively effects the successive processes or results in defective products.

To overcome the shortcomings, the present invention provides a laser processing device with a high speed vibration unit to mitigate or obviate the aforementioned problems.

SUMMARY OF THE INVENTION

The main objective of the invention is to provide a laser processing device that has a high speed vibration unit and is capable of generating a three-dimensional cylindrical light beam.

A laser processing device in accordance with the present invention comprises a laser source and a high speed vibration unit. The laser source has a laser-emitting end being capable of emitting a laser beam adapted to process a workpiece. The high speed vibration unit is located on a moving path of the laser beam and is capable of vibrating periodically along a direction parallel to the moving path of the laser beam such that the focusing point of the laser beam moves periodically on the workpiece at high speed. The laser processing device with the fast moving focusing point is able to efficiently process parts of the workpiece at specific depths. Therefore, product quality and production rate are increased.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
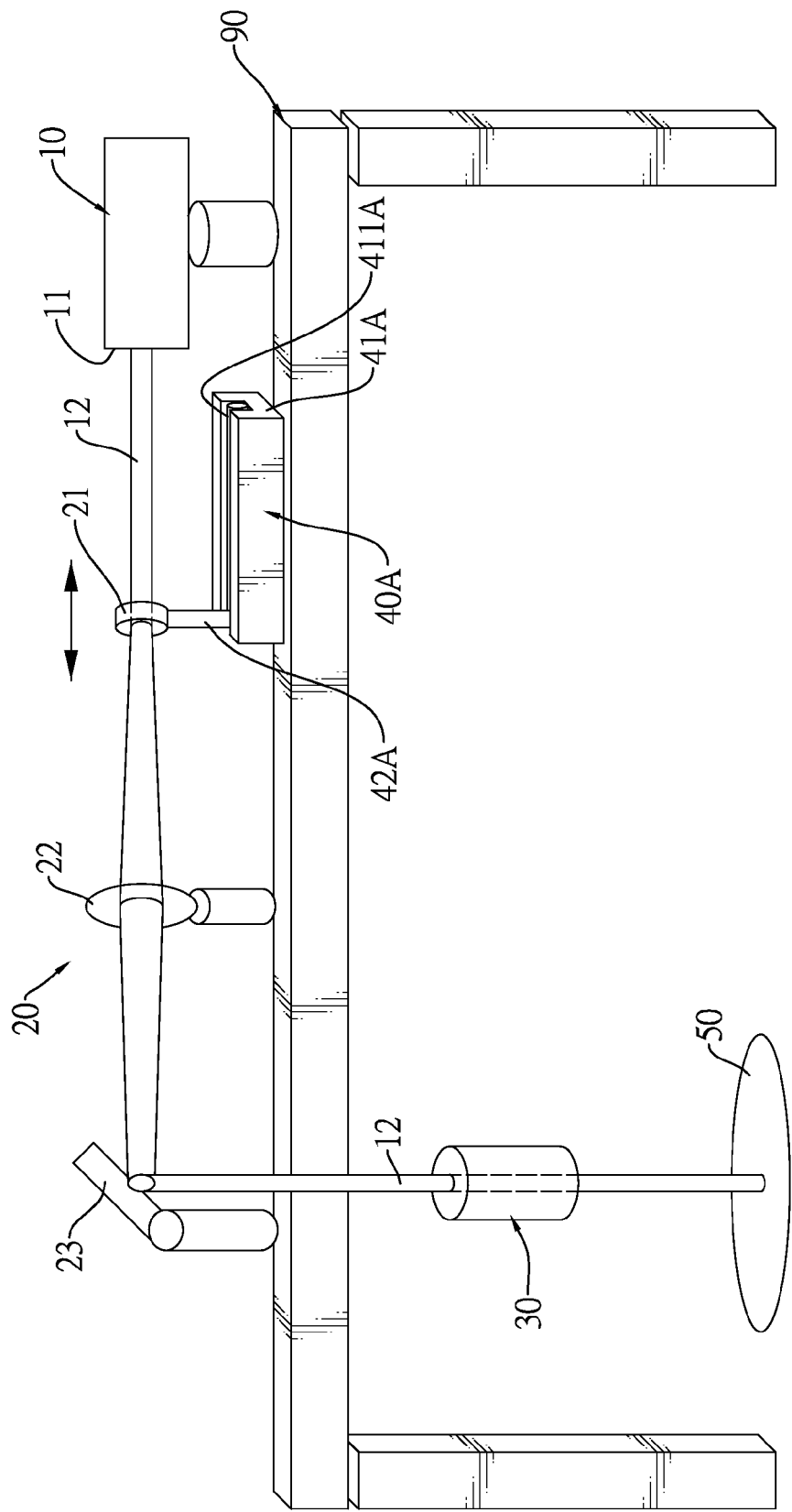
FIG. 1 is an operational side view of a first embodiment of a laser processing device with a high speed vibration unit in accordance with the present invention that is processing a workpiece.

With reference to FIG. 1 a first embodiment of a laser processing device with a high speed vibration unit in accordance with the present invention may process a workpiece 50 and comprises a supporting frame 90, a laser source 10, a lens set 20, a focusing lens assembly 30 and a high speed vibration unit 40A.

The laser source 10 is mounted on the supporting frame 90 and has a laser-emitting end 11 that is capable of emitting a laser beam 12.

The lens set 20 is mounted the supporting frame 90, is located in front of the laser-emitting end 11 of the laser source 10 and lies in a moving path of the laser beam. The lens set 20 may have a beam expansion lens 21, a stationary lens 22 and a reflector 23. The beam expansion lens 21, the stationary lens 22 and the reflector 23 are sequentially mounted in front of the laser-emitting end 11 of the laser source 10. The reflector 23 is oriented to have an acute angle of 45 degrees relative to the laser beam 12 of the laser source 10 such that the laser beam 12 is reflected and directed by the reflector 23 from a horizontal direction to a vertical direction.

The focusing lens assembly 30 may be mounted on the supporting frame 90, is arranged aside the lens set 20 and is located on the moving path of the laser beam 12 and focuses the laser beam 12 to form a focusing point for processing the workpiece 50. Preferably, the focusing lens assembly 30 is arranged aside the reflector 23 and is located in the moving path of the laser beam 12 oriented along the vertical direction.

The high speed vibration unit 40A may be mounted on the supporting frame 90, is located on the moving path of the laser beam 12, is connected to the lens set 20 and is capable of vibrating periodically along a direction parallel to the moving path of the laser beam 12 such that the focusing point of the laser beam 12 moves periodically on the workpiece 50 at high speed. Furthermore, the high speed vibration unit 40A may has a driving unit that is mechanical type, valve type, piezoelectric type, magnetic field type, electric field type, or sound field type.

Preferably, the high speed vibration 40A is connected to the beam expansion lens 21 of the lens set 20 and has a mounting bracket 41A and an oscillating element 42A. The mounting bracket 41A has a recess 411A defined in the mounting bracket 41A. The oscillating element 42A is mounted periodically slidably in the recess 411A, is capable of vibrating periodically along the direction parallel to the moving path of the laser beam 12 and has a free end connected to the beam expansion lens 21.

When the laser processing device operates, the laser beam 12 is emitted from the laser source 10 through the beam expansion lens 21 of the lens set 20. The expansion lens 21 is moved periodically by the high speed vibration unit 40A so that the focusing point of the laser beam 12 with maximum energy moves periodically at different depths of the workpiece 50. When moving speed of the focusing point is larger than thermal conduction on the workpiece 50, the focusing point of the laser beam 12 processes a part of the workpiece 50, moves away from the part and then move back to process the part again before the part is hardened. Therefore, no part of the workpiece 50 is hardened to form material block during the laser processing at specific depth of the workpiece 50. The high speed reciprocal movement of the focusing point of the laser beam 12 also expedites laser processing. The processing rate is therefore increased.

Figure 2:
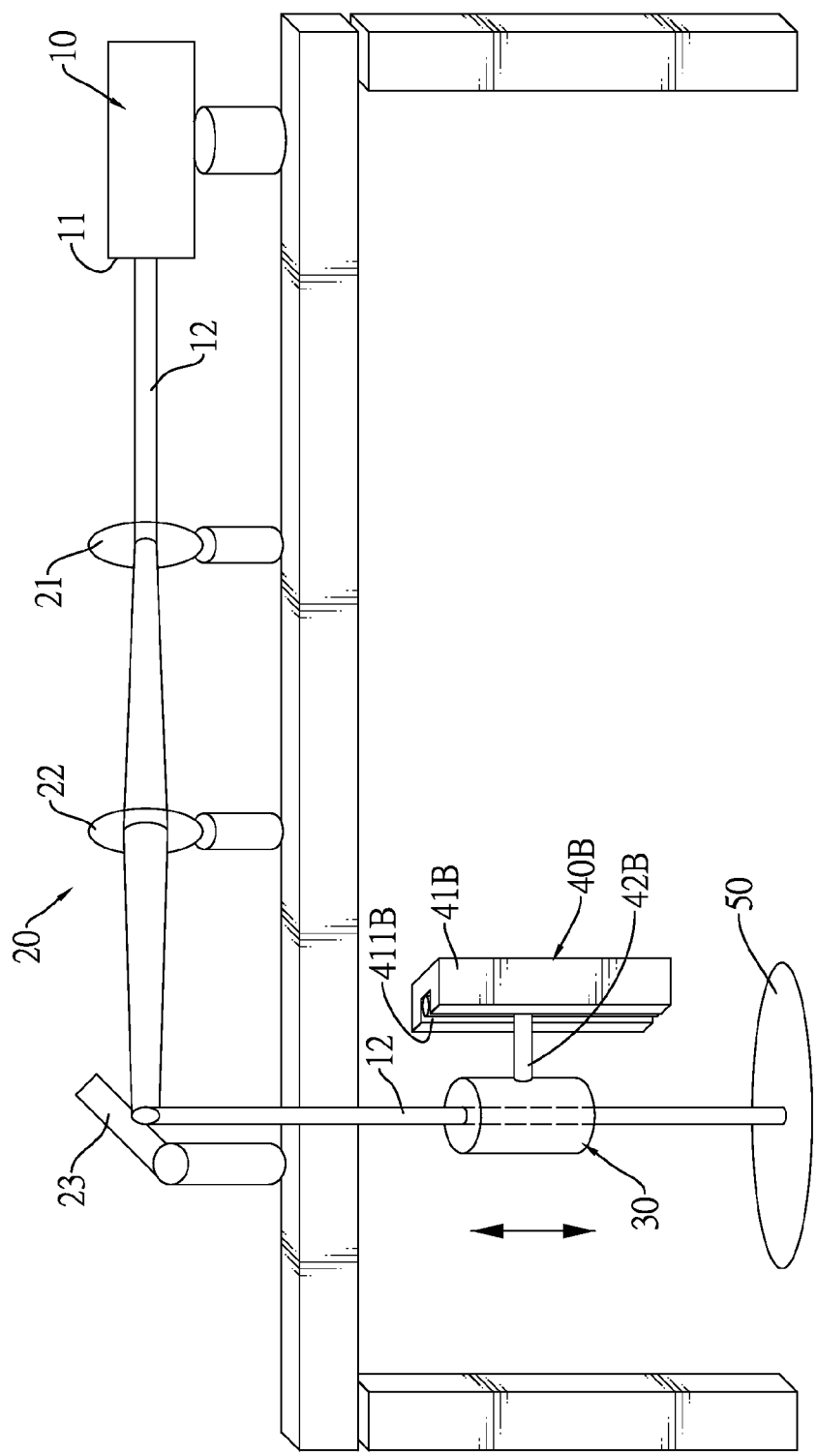
FIG. 2 is an operational side view of a second embodiment of a laser processing device with a high speed vibration unit in accordance with the present invention that is processing a workpiece.

With reference to FIG. 2, in a second embodiment of the laser processing device in accordance with the present invention, the high speed vibration unit 40B is connected to the focusing lens assembly 30 and has a mounting bracket 41B and an oscillating element 42B. The mounting bracket 41B has a recess 411B defined in the mounting bracket 41B. The oscillating element 42B is mounted periodically slidably in the recess 411B, is capable of vibrating periodically along the direction parallel to the moving path of the laser beam 12 and has a free end connected to the focusing lens assembly 30.

When the laser processing device operates, the laser beam 12 is emitted from the laser source 10 through the focusing lens assembly 30. The focusing lens assembly 30 is moved periodically by the high speed vibration unit 40B such that the focusing point of the laser beam 12 with maximum energy moves periodically at different depths of the workpiece 50.

Figure 3:
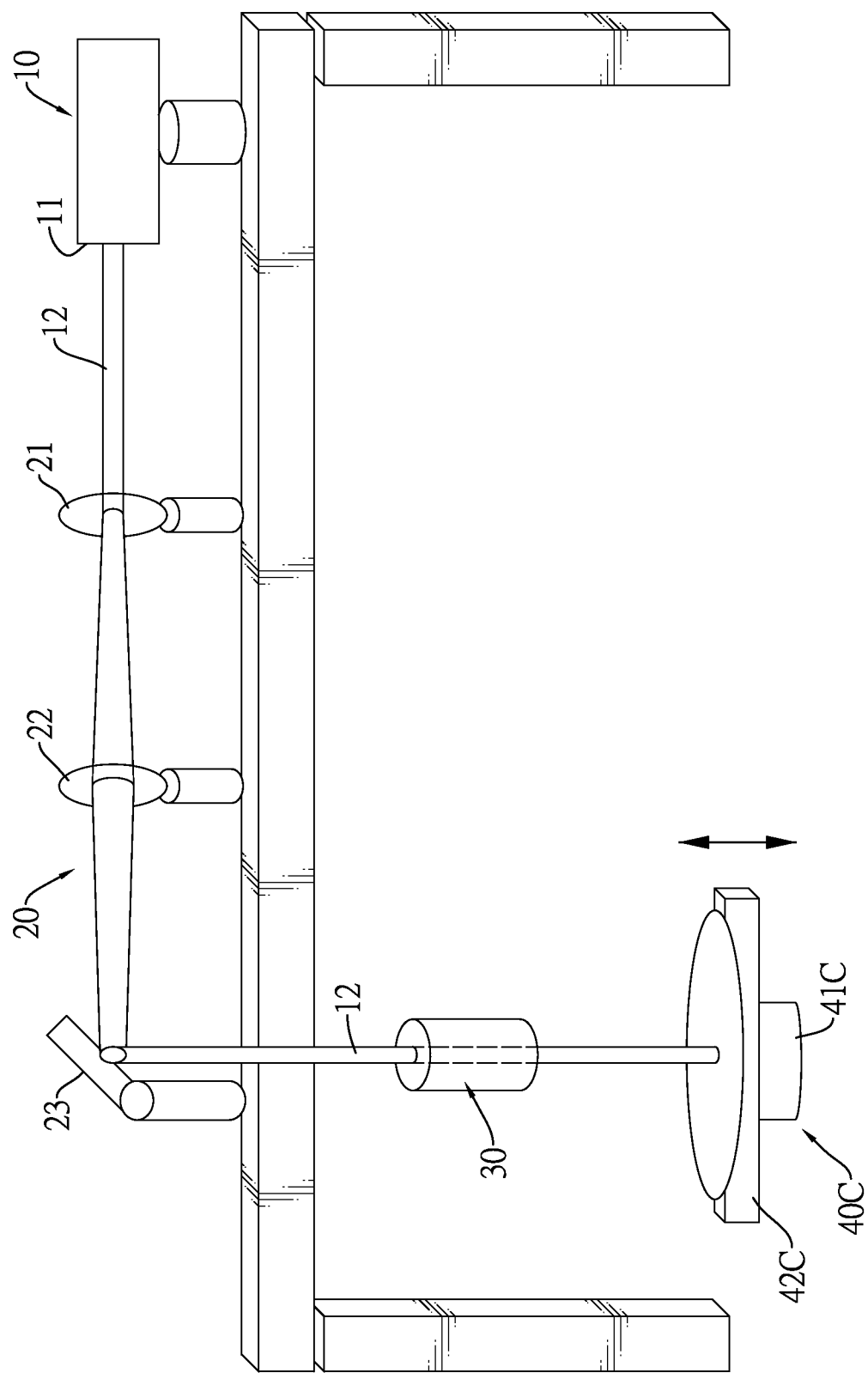
FIG. 3 is an operational side view of a third embodiment of a laser processing device with a high speed vibration unit in accordance with the present invention that is processing a workpiece.

With reference to FIG. 3, in a third embodiment of the laser processing device with a high speed vibration unit in accordance with the present invention, the high speed vibration unit 40C is a supporting stage, is located substantially on the focusing point of the laser beam 12, supports the workpiece 50 and has a mounting bracket 41C and an oscillating platform 42C. The oscillating element 42C is mounted periodically slidably on the mounting bracket 41C, is capable of oscillating along the direction parallel to the moving path of the laser beam 12 and supports the workpiece 30.

When the laser processing device operates, the laser beam 12 is emitted from the laser source 10 through the focusing lens assembly 30. The workpiece 50 is moved periodically by the high speed vibration unit 40C such that the focusing point of the laser beam 12 with maximum energy moves periodically at different depths of the workpiece 50.

The laser processing device employs the high speed vibration unit 40A, 40B, 40C to vibrate the beam expansion lens 21, the focusing lens assembly 30 or the workpiece 50 to periodically move the focusing point. The fast periodically moving focusing point is able to efficiently process parts of the workpiece 50 at specific depths. Therefore, product quality and production rate are increased.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A laser processing device comprising:
    a laser source having a laser-emitting end being capable of emitting a laser beam along a first beam path;
    a beam expansion lens mounted in the first beam path and configured to receive the laser beam;
    a stationary lens mounted in the first beam path and configured to transmit the laser beam passing from the beam expansion lens;
    a reflector mounted in the first beam path and configured to reflect the laser beam passing from the stationary lens to a second beam path having an included angle with the first beam path;
    a focusing lens assembly mounted in the second beam path and configured to receive the laser beam reflected from the reflector to process a workpiece by a focusing point of the laser beam; and
    a high speed vibration unit located on a moving path of the laser beam and being capable of vibrating periodically along a direction parallel to the moving path of the laser beam such that the focusing point formed by the laser source moves periodically.

2. The laser processing device as claimed in claim 1, wherein the high speed vibration unit is connected to the focusing lens assembly.

3. The laser processing device as claimed in claim 2, wherein the high speed vibration unit has
    a mounting bracket having a recess defined in the mounting bracket; and
    an oscillating element mounted periodically slidably in the recess, being capable of vibrating periodically along a direction parallel to the moving path of the laser beam and connected to the focusing lens assembly.

4. The laser processing device as claimed in claim 3, wherein the oscillating element has a free end connected to the focusing lens assembly.

5. The laser processing device as claimed in claim 1, wherein the high speed vibration unit is a supporting stage and is located substantially on the focusing point of the laser beam and is adapted to support the workpiece.

6. The laser processing device as claimed in claim 1, wherein the high speed vibration unit is connected to the beam expansion lens.

7. The laser processing device as claimed in claim 6, wherein the high speed vibration unit has
    a mounting bracket having a recess defined in the mounting bracket; and
    an oscillating element mounted periodically slidably in the recess, being capable of vibrating periodically along a direction parallel to the moving path of the laser beam and connected to the beam expansion lens.

8. The laser processing device as claimed in claim 7, wherein the oscillating element has a free end connected to the beam expansion lens.

* * * * *